March 27, 1962 E. W. DONATH 3,027,496
FAIL-SAFE CIRCUIT FOR CONTROLLED APPARATUS
Filed Feb. 24, 1959
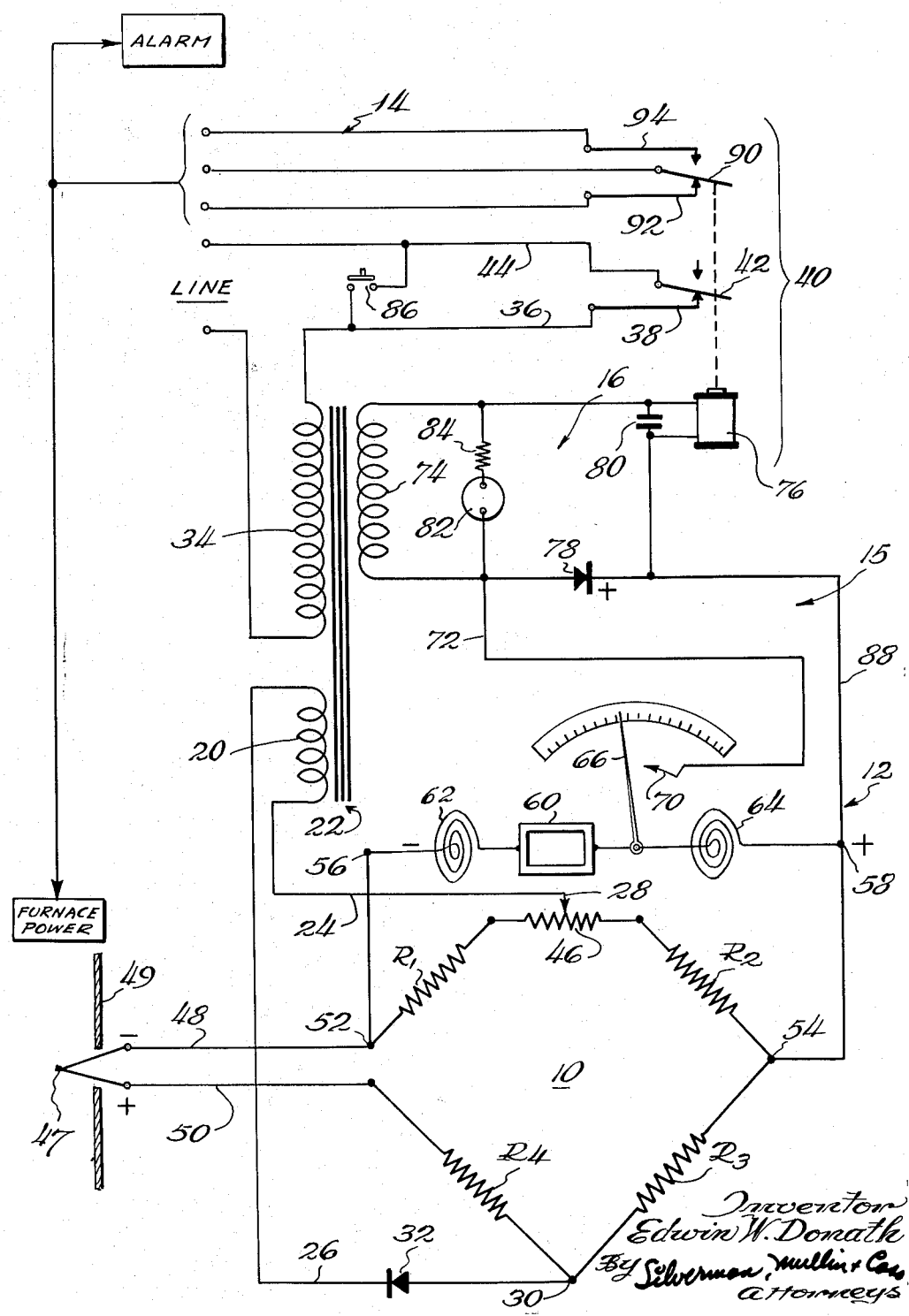
Inventor
Edwin W. Donath
By Silverman, Mullin & Co.
Attorneys

United States Patent Office 3,027,496
Patented Mar. 27, 1962

3,027,496
FAIL-SAFE CIRCUIT FOR CONTROLLED APPARATUS
Edwin W. Donath, Arlington Heights, Ill., assignor to Illinois Testing Laboratories, Inc., Chicago, Ill., a corporation of Illinois
Filed Feb. 24, 1959, Ser. No. 794,998
13 Claims. (Cl. 317—133.5)

This invention relates generally to apparatus which is controlled to maintain the same at certain desired operating conditions, but more particularly is concerned with a so-called "fail-safe" circuit which is normally inoperative so long as the controlled apparatus is operating normal, but which will become operative when the operation of the controlled apparatus becomes abnormal.

By the designation "controlled apparatus" it is intended to mean any device or group of devices which are involved in a process or system in which some measure of control is exerted as for example by a feed-back arrangement tending by servos or the like to maintain a constant condition, or a condition existing over a permissible range. As examples of control apparatus one can consider chemical, metallurgical, mechanical, electrical and flow processes where conditions of temperature, current, voltage, flow, and the like are maintained at some desired value or between some predetermined range of values. The feed-back circuits of such processes or systems are designed to provide error signals for making the necessary changes to maintain the conditions desired. The concept of a controlled process need not be as sophisticated as completely automated systems for the invention to be applied, it only being required that a normal condition be maintained, and that a change from such condition be manifest in a measurable quantity that can operate upon the fail-safe circuit.

The fail-safe circuit is intended for providing a signal when all else fails, to be used for various purposes connected with the operation of the system. For example, where a furnace is in operation, if the temperature should rise to some dangerous value because of the inoperativeness of the control means which normally maintains the normal temperature, a device such as described herein should become energized to shut down the furnace, by operating a fuel valve, by cutting out the electric current of the furnace, by separating carbon rods or withdrawing fuel rods, or any of a number of other things. The circuit herein could in addition or instead sound an alarm, light a light, or perform other functions.

Furnaces and ovens are not the only controlled apparatus with which the fail-safe circuit of the invention can be used. Motors, transformers, flow systems, retorts and pressure vessels, various kinds of power generators and the like, all can be safely protected by circuits of the type shown and described herein. Accordingly, the conditions of operation can be conditions of temperature, flow, current, voltage, steam pressure, etc.

The basic circuit of the invention herein is usually associated with some form of transducer which converts the manifestation of the abnormal condition, regardless of what its medium may be, into a measurable quantity comprising a current that can drive the movement of a sensitive galvanometer. The galvanometer has a delicately balanced but freely movable pointer and an adjustable contact which is associated with the pointer in the path thereof, but which normally does not engage the same. When conditions within the controlled apparatus are normal, the circuit is adjusted so that the value of current flowing in the galvanometer will maintain the pointer at a position spaced from the contact. When, however, the conditions of the controlled apparatus become abnormal, the pointer moves to engage with the contact to close a circuit which may cause certain switching actions to take place which perform the functions required of the fail-safe circuit, usually consisting of the deenergization of a piece of equipment which is particularly dangerous.

The primary object of the invention is to provide a fail-safe circuit which is completely reliable, simple in construction and operation, and which can be in stand-by condition for relatively long periods of time without deterioration or decrease in dependability.

The pointer-contact form of control device has long been known, but has been associated with disadvantageous operation. The difficulty has been that too often minute sparking or fusing occurs at the engagement and the result is that the very fine elements are welded together and cannot be separated without mechanical vibration or literal prying apart. Other disadvantages have been the reluctance to use galvanometer movements with substantial quantities of current flowing through the support coils because of frequent burn-out requiring replacement and the like.

The circuit herein has an important advantage in that it has been found that instead of welding the pointer and contact together when they touch, the circuit in some manner causes the pointer to spring back a minute amount immediately following engagement with the contact. This light and momentary contact is sufficient to cause operation of the device.

Other objects of the invention are the provision of novel circuitry in which the primary winding of the circuit is opened by the operation of the relay through the touching of the pointer and contact so that there is a slight circulating current or decay of field in the secondary circuit tending to undulate the springs mounting the pointer of the device; the provision of a novel arrangement in which the control solenoid is a direct current device energized through an A.C. circuit and a rectifier and in which the closing of the circuit through the pointer short-circuits the rectifier to de-energize the solenoid.

Many other objects and inventions should become apparent to those skilled in this art as a preferred embodiment thereof is described in detail hereinafter.

The single FIGURE is a circuit diagram of the invention applied to a fail-safe circuit for use with a furnace or oven, the temperature of which is not to exceed a certain predetermined value.

The reference character 10 is used to designate a D.C. bridge which supplies the current for the galvanometer 12 the pointer of which will provide the desired control. The controlled circuit is designated generally 14 and the portion of the apparatus which may be termed the secondary or relay circuit is designated 16. The simplicity of the arrangement will become apparent from the explanation of operation of the device. The controlled apparatus is normally operating through the controlled circuit 14, which has a normal condition. The relay circuit 16 is operative and energized during this period of time. Should the bridge 10 become unbalanced due to high current or because of breakage or burn-out of the thermocouple, the current flowing in the galvanometer will rise, and the pointer will close a bypass branch 15 of the relay circuit 16 as a result of which the controlled circuit changes in condition and will usually modify the controlled apparatus to a safe condition. This is usually represented by a de-energization of the controlled apparatus. As explained, this could also or in the alternative sound an alarm. Thus, there are two types of protection afforded, thermocouple failure and high current, the thermocouple failure requiring the bridge 10 for the production of current in the galvanometer. The bridge could otherwise be eliminated, since the thermocouple itself could drive the galvanometer if it were not broken.

The bridge 10 has a source of D.C. which comprises a low voltage A.C. winding 20 on the transformer 22 which is applied through the leads 24 and 26 to the terminals 28 and 30 respectively of the bridge 10 through a rectifier 32 in the lead 26. The transformer 22 has a primary winding 34 which is connected to a source of A.C. voltage such as a conventional 115 or 220 volt line through the lead 36 and a contact 38 of a relay 40, a movable contact arm 42 of said relay and a lead 44. The terminal 28 of the bridge 10 comprises the wiper of an adjustable potentiometer 46 by means of which the bridge may be adjusted and balanced. The balance arms of the bridge comprise the resistors $R_1$, $R_2$, $R_3$ and $R_4$. A thermocouple 47 is connected into the bridge in series with the resistor $R_4$ through the leads 48 and 50, the thermocouple being located in a furnace or oven 49, for example, which in this instance comprises the controlled apparatus.

The terminals 52 and 54 of the bridge 10 are connected respectively across the negative and positive terminals 56 and 58 of a moving coil galvanometer 12, the moving coil of which is represented by the rectangle 60 and the sensitive spiral mounting springs of which are shown at 62 and 64. The pointer 66 traverses a scale 68 and so long as the conditions in the controlled apparatus 49 are normal, will not move over the scale 68 to any position which will result in current flow in the by-pass circuit 15. An adjustable contact 70 which is connected by the lead 72 to one side of the secondary winding 74 of the transformer 22 may be positioned to limit the maximum movement of the pointer 66, representing a temperature (or other condition) of the controlled apparatus which is dangerous and which should result in said apparatus being shut down, and/or a warning given.

The relay 40 includes a D.C. solenoid 76 which receives alternating current at say 115 volts provided by the secondary winding 74 rectified by the rectifier 78 and filtered by the condenser 80, there being a gaseous discharge lamp 82 such as a low voltage neon lamp having a series ballast resistor 84 connected across the secondary 74. The normal condition of the circuit is with the relay energized. This moves the contact arm 42 against contact 38 thus keeping the line connected across the primary winding 34, this being in the nature of a holding circuit. When energizing the device and placing the same in condition to protect the controlled apparatus, the reset switch 86 is momentarily closed which by-passes the arm 42 and contact 38.

In operation the device is quite reliable and fool-proof and has been found to provide the interesting phenomenon that the moment contact is made between the pointer 66 and the contact 70, the pointer will slightly spring back. The reason for this will be explained hereinafter.

The bridge 10 is normally balanced or nearly so. The condition is such that the pointer 66 will not approach the contact 70. If the thermocouple should burn out or register a greatly abnormal temperature, the bridge 10 will immediately become unbalanced and the pointer 66 will engage the contact 70. This will short-circuit the rectifier 78 through the conductor 88 around through the by-pass branch 15 and since the A.C. which is now applied across the solenoid 76 will practically all flow through the condenser 80 (and in any event is not D.C.), the solenoid is de-energized, and the arm 42 moves off the contact 38, which immediately opens the primary winding 34. The control circuit 14 is now changed. The arm 90 engaged against the contact 92 could be arranged to represent the normal condition of the control circuit and hence the normal condition of the controlled apparatus 49 and the arm 90 engaged against the contact 94 could comprise the abnormal condition of the control circuit and the controlled apparatus. These contacts and the arm 90 connect with any suitable controlled apparatus through terminals as shown. Any desired control can be achieved through this arrangement. For example, the furnace could normally be operative when the arm 90 engages contact 92, and be inoperative or de-energized when the arm 90 is on contact 94. Bells, alarms and annunciators or warning lights could be operated by this circuit, either instead of or together with means to de-energize the furnace. The blocks in the figure show this. The indicator lamp 82 is energized when the device is arranged to protect the controlled apparatus. When the relay 76 is de-energized and the primary winding 34 opened, the lamp 82 becomes extinguished and notifies the operator that the device has operated and caused a change of condition in the controlled apparatus, such as, for example, shutting down the furnace. Note that an important additional protective feature is that the failure of the line which supplies power to the device also de-energizes relay 40 and extinguishes lamp 82.

As previously pointed out, the novel circuit herein is associated with a furnace control only by way of an example of the invention and not limitation. The circuit is highly advantageous when associated with such apparatus which utilizes a thermocouple as the source of a measurable quantity in connection with a balanced bridge, however, the terminals 56 and 58 could be connected to any transducer which provides a current which can be adjusted to remain within a predetermined range for normal operation of some controlled apparatus, and the exceeding of which represents an abnormal condition it is desired to control or concerning which it is desired to warn the operator.

It has been previously mentioned that the circuit is advantageous in that the engagement of the contact 70 with the pointer 66 does not result in a welding or fusing of the two, which is probably the most difficult failing of such structures to be overcome. In this circuit it will be noted that the de-energization of the solenoid results in the opening of the primary circuit, instead of a secondary circuit of the transformer 22. This is an unobvious and normally avoided circuit arrangement, since the voltage of the primary winding 34 is usually much greater than the voltages of any of the secondaries. It has been found, however, that the disadvantages of opening contacts 38 and 42 at higher voltages are far out-weighed by the advantages thereof, since in the circuit shown and described there is absolutely no welding or fusing, even momentarily, of the pointer and the contact 70 when they electrically engage. This means that the springs of the galvanometer can be fine and the meter itself made more delicate and sensitive.

The reasons for this occurring are believed to be due to a theory which may or may not be correct, but which seems to support the phenomenon. As the pointer 66 approaches the contact 70, a voltage exists across the rectifier 78 which in turn appears between pointer and contact. Thus there is a minute electrostatic field which acts upon the very sensitive pointer and literally draws it against the contact some instant before the pointer 66 will normally reach the pointer 70. The making of the contact immediately relaxes the solenoid and the primary 34 is opened, which operates the control circuit 14. With the opening of the primary winding 34, there is no power applied to the bridge 10, and hence the current flowing through the galvanometer 12 decreases.

In the meantime, the rectifier 78 is by-passed by the A.C. current flowing in the relay circuit 16, and this A.C. is sufficient to undulate or vibrate the sensitive helical support springs 64, either by virtue of the change of flux occurring in the passage of minute current or because of oscillatory transients which may exist in the circuit. It is believed that keeping the circuit of the secondary winding 74 intact is the direct cause of this, since there will be a collapse of the field of the secondary or a partial discharge of the condenser 80 or both, which continue for a small increment of time, even after the primary winding 34 is opened. This vibration of the spring 64 is believed to infinitesimally shake the pointer 66 and thus break loose any fusing that might occur, and of course the moment there is no further voltage providing the electrostatic attraction of the pointer to the contact, it will assume its position just prior to engagement, which it will be recalled was slightly spaced from the contact 70.

This phenomenon is what contributes greatly to the reliability of the device, since it is completely dependable, and can be re-set to protect controlled apparatus, without the need of continuously inspecting the pointer 66 for fusing. The re-set switch 86 may therefore be remote from the device itself.

The invention is advantageously applied to the protection of a heat-treating furnace in which a thermocouple provides the source of current for operating the galvanometer 12. The instrument can be mounted in a small case and have an extension cord which plugs into an outlet. In such a structure, the primary winding was 240 volts A.C., and the two secondaries 74 and 20 provided 115 volts and 6 volts respectively. The D.C. solenoid 76 had 10,000 ohms resistance and the by-pass condenser was 1 microfarad with suitable voltage rating. The potentiometer 46 was 5,000 ohms, the resistors $R_1$ and $R_2$ were each 12,000 ohms. The resistors $R_3$ and $R_4$ were chosen to provide substantially equal arms when used with the thermocouple 47. The controlled circuit 14 was contained within the housing of the instrument and the output terminals provided for the purchaser to use as he saw fit. Usually the bottom two terminals were intended to serve as a completed circuit to keep the furnace energized, and when these two terminals were isolated by the opening of the switch represented by contacts 90 and 92 the furnace 49 was shut down.

The versatility and flexibility of the circuit enables it to be used in a wide variety of applications, but the basic structure as defined in the appended claims will in no wise be discarded in such applications. Variations in the circuitry and structure are also capable of being made within the spirit of the invention. It is desired also to point out that the only purpose for stating a theory of operation herein has been to attempt to shed some light upon the novel results achieved, but this should not be interpreted as confining or restrictive with respect to the coverage of the invention. Even if the theory is incorrect, the structure which is described and claimed will produce the beneficial and advantageous functions assigned thereto. The reliability and dependability of the device has been ascertained by the construction and successful testing of the embodiment described herein, in which repeated cycling of the circuit in causing engagement of the pointer with the adjustable contact resulted in no welding or fusing whatsoever. The relay 40 operated perfectly and satisfactorily to change the condition of the control circuit 14.

The claims hereinafter may refer to the word "needle" as synonymous with pointer.

What it is desired to claim by Letters Patent is:

1. A fail-safe circuit or the like for controlled apparatus having a transducer connected therewith adapted to be energized from a source of A.C. voltage which comprises a transformer having primary and secondary windings, a relay circuit connected across said secondary winding and having a series rectifier and a D.C. solenoid therein, a resettable holding circuit in series with said primary winding and including a pair of contacts normally maintained closed when said solenoid is energized, a moving pointer galvanometer and a contact adapted to engage the pointer, said pointer and contact being in a circuit bypassing said series rectifier, and a control circuit the condition of which is adapted to be changed by de-energization of the said solenoid and including at least one switch operated by said solenoid, and means adapted for connecting the galvanometer to said transducer to enable said galvanometer to move its pointer in response to the current produced by said transducer to engagement with said contact if said current represents an abnormal condition of said controlled apparatus.

2. A circuit as claimed in claim 1 in which said transducer includes a balance bridge.

3. A circuit as claimed in claim 1 in which there is an indicator lamp across the secondary winding.

4. A circuit as claimed in claim 2 in which said transformer has a second secondary winding providing a source of current for said bridge.

5. A device for actuating a control switch when an abnormal condition occurs in a controlled apparatus which comprises, a galvanometer having a moving coil with a pointer attached to said coil, an adjustable contact arranged to electrically engage with said pointer when said pointer reaches the position of said adjustable contact, said controlled apparatus adapted to have a source of current associated therewith the value of current flow being related to the normality of condition of said controlled apparatus, means providing a connection between said source and said galvanometer whereby said pointer will be moved a substantial degree and into engagement with said contact upon the occurrence of an abnormal condition, but will not engage said contact while there is a current flow representing a normal condition, a transformer having a primary winding and a secondary winding, a normally open switch in series with said primary winding and together therewith adapted to be connected across an A.C. source of power, a reset switch for short-circuiting said normally open switch, a D.C. solenoid and a rectifier in series therewith and together connected across said secondary winding, said normally open switch adapted to be closed magnetically by said solenoid when said solenoid is energized by direct current, a by-pass circuit around said rectifier with said pointer and contact being in said by-pass circuit whereby to de-energize said solenoid when said pointer and contact are engaged, and said control switch being magnetically actutable by said solenoid when said abnormal condition occurs.

6. A device as claimed in claim 5 in which said pointer has helical spring means mounting the same and said helical spring means is in said by-pass circuit.

7. A thermocouple-operated fail-safe circuit which comprises, a control switch adapted to be actuated when there is a substantial change from normal thermocouple current, a transformer having a primary winding adapted to be connected across a source of A.C. power and a secondary winding, a normally open switch in series with said primary winding and a manual reset switch across said normally open switch to enable energization of said primary winding without closing said normally open switch, a relay circuit having a solenoid therein connected across said secondary winding and a series rectifier in said relay circuit to provide direct current for energization of said solenoid, said normally open switch being closed with energization of said solenoid, a moving coil galvanometer and a pointer secured to said coil, an electrical contact adapted to be engaged by said pointer and said pointer and contact being connected across said rectifier to short circuit the same and de-energize said solenoid when said pointer and contact electrically engage, a bridge having a source of D.C. connected across its power terminals and said galvanometer across its balance terminals, one arm of said bridge having said thermocouple in series therewith and the bridge being balanced with normal current flowing in said thermocouple and the resulting current flow in said galvanometer providing a position of said pointer spaced from said contact, but said bridge becoming unbalanced when said thermocouple current changes substantially from normal whereby to move said pointer into engagement with said contact, de-energize said solenoid, open said normally open switch and actuate said control switch.

8. A circuit as claimed in claim 7 in which there is a second secondary winding on said transformer and a second rectifier in series therewith comprising said D.C. source.

9. A switching circuit operated by a galvanometer having a conductive needle mounted upon at least one hair spring and an adjustable contact adapted to electrically engage the needle, means connecting the galvanometer to a varying source of current whereby the needle will engage the contact when a predetermined current value is reached, a transformer adapted to be energized from a source of A.C. electrical power, a primary winding and a secondary winding on said transformer, a D.C. relay having an energizing circuit which includes said secondary winding and a rectifier, a holding circuit for said relay including a switch in circuit with said primary winding electromagnetically actuated by said relay, said needle, hair spring and contact being connected in series in a by-pass path around said rectifier whereby to de-energize said relay when said needle and contact engage, said switch being closed when said relay is energized and opened when said relay is de-energized, and said switching circuit including a second switch adapted to be actuated by said relay at least when same is de-energized.

10. In a fail-safe circuit of the type wherein the primary winding of a transformer is maintained energized by means under control of the secondary winding of said transformer and wherein a sensing device is provided for responding to the condition of certain apparatus; the improvement comprising a condenser connected across the said secondary and in shunt with a portion of said means, said means including a unidirectional circuit element connected to said secondary and arranged to pass current in one direction for enabling said means to maintain said primary energized, a galvanometer having contacts and disposed to be controlled by said sensing device for closing said contacts when said sensing device responds to a predetermined condition of said apparatus, and a circuit completed by said galvanometer contacts for shunting said unidirection element to disable said means whereby said source is disconnected from said primary to de-energize said primary while said condenser is discharged without causing arcing across said contacts.

11. A fail-safe circuit of the type wherein the primary winding of a transformer is maintained energized by means which are connected by a device having low impedance to current in one direction from the secondary winding of said transformer and wherein a sensing device is provided for responding to the condition of certain apparatus, the improvement comprising a galvanometer disposed to be controlled by said sensing device for closing a pair of contacts when said sensing device responds to a predetermined condition of said apparatus, and a circuit completed by said galvanometer contacts for shunting said low impedance device whereby arcing across said contacts is minimized and said means are controlled to disconnect said source from said primary for de-energizing said primary.

12. The arrangement claimed in claim 11 in which said means includes a high impedance device connected across said secondary in series with said low impedance device, a condenser connected in shunt with said high impedance device, and said low impedance device includes a rectifier.

13. A fail-safe circuit of the type wherein the primary winding of a transformer is maintained energized by a relay having a condenser in shunt therewith and connected to the secondary winding of said transformer through a rectifying element and wherein a sensing device is provided for responding to the condition of certain apparatus, the improvement comprising a galvanometer disposed to be controlled by said sensing device for closing a pair of contacts when said sensing device responds to a predetermined condition of said apparatus, and a circuit completed by said galvanometer contacts for shunting said element to control said relay for de-energizing said primary whereafter the discharge of said condenser takes place through said secondary and through said relay without arcing across said contacts.

References Cited in the file of this patent
UNITED STATES PATENTS

| | | |
|---|---|---|
| 1,968,198 | Gibbs | July 31, 1934 |
| 2,441,984 | Armstrong | May 25, 1948 |
| 2,456,199 | Lamb | Dec. 14, 1948 |
| 2,720,614 | Cairns | Oct. 11, 1955 |
| 2,753,492 | Jay | July 3, 1956 |